(12) United States Patent
Medrano

(10) Patent No.: US 12,451,761 B2
(45) Date of Patent: Oct. 21, 2025

(54) MICROMETER DRIVER SYSTEM AND METHOD

(71) Applicant: Ruben Medrano, Wheeling, IL (US)

(72) Inventor: Ruben Medrano, Wheeling, IL (US)

( * ) Notice: Subject to any disclaimer, the term of this patent is extended or adjusted under 35 U.S.C. 154(b) by 328 days.

(21) Appl. No.: 18/336,344

(22) Filed: Jun. 16, 2023

(65) Prior Publication Data
US 2024/0421661 A1 Dec. 19, 2024

(51) Int. Cl.
H02K 7/14 (2006.01)
G01B 3/18 (2006.01)
H02K 5/04 (2006.01)
H02K 11/20 (2016.01)

(52) U.S. Cl.
CPC ............. H02K 7/145 (2013.01); G01B 3/18 (2013.01); H02K 5/04 (2013.01); H02K 11/20 (2016.01)

(58) Field of Classification Search
CPC .......... G01B 3/18; H02K 7/145; H02K 11/20; H02K 5/04
USPC .................................. 310/12.03, 12.04, 68 B
See application file for complete search history.

(56) References Cited

U.S. PATENT DOCUMENTS

| 2,933,816 A * | 4/1960 | Gunther ................... G01B 3/18 33/819 |
| 10,283,922 B2 | 5/2019 | Niwano et al. |
| 10,451,450 B2 | 10/2019 | Niwano et al. |
| 10,866,126 B2 | 12/2020 | Iori et al. |
| 2021/0372762 A1* | 12/2021 | Yamaji ..................... G01B 5/02 |
| 2024/0102784 A1* | 3/2024 | Nahum ..................... G06T 7/13 |

FOREIGN PATENT DOCUMENTS

| CN | 1542399 A | * 11/2004 |
| CN | 102135404 A | * 7/2011 |
| JP | 2003185401 A | * 7/2003 |

* cited by examiner

Primary Examiner — Jose A Gonzalez Quinones
(74) Attorney, Agent, or Firm — Quarles & Brady LLP

(57) ABSTRACT

Devices and methods for driving a micrometer are provided. The device includes a body, a collet, a motor, and a controller. The body is configured to be coupled to a frame of the micrometer. The collet is configured to be coupled to a ratchet of the micrometer and to rotate the ratchet. The motor is coupled to the collet and rotates the collet to rotate the ratchet. The controller controls operation of the motor.

20 Claims, 11 Drawing Sheets

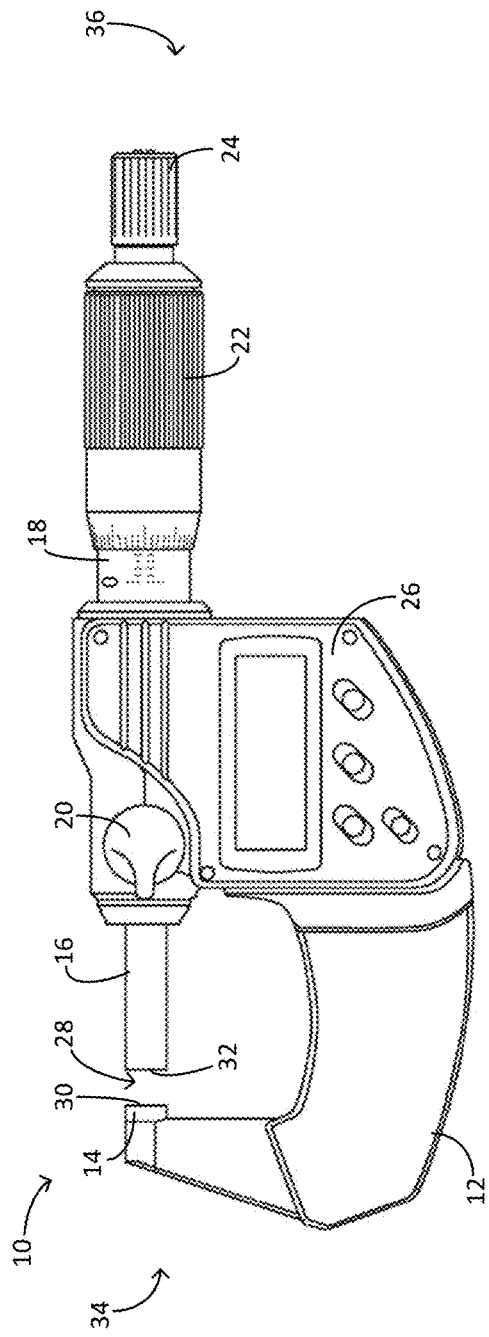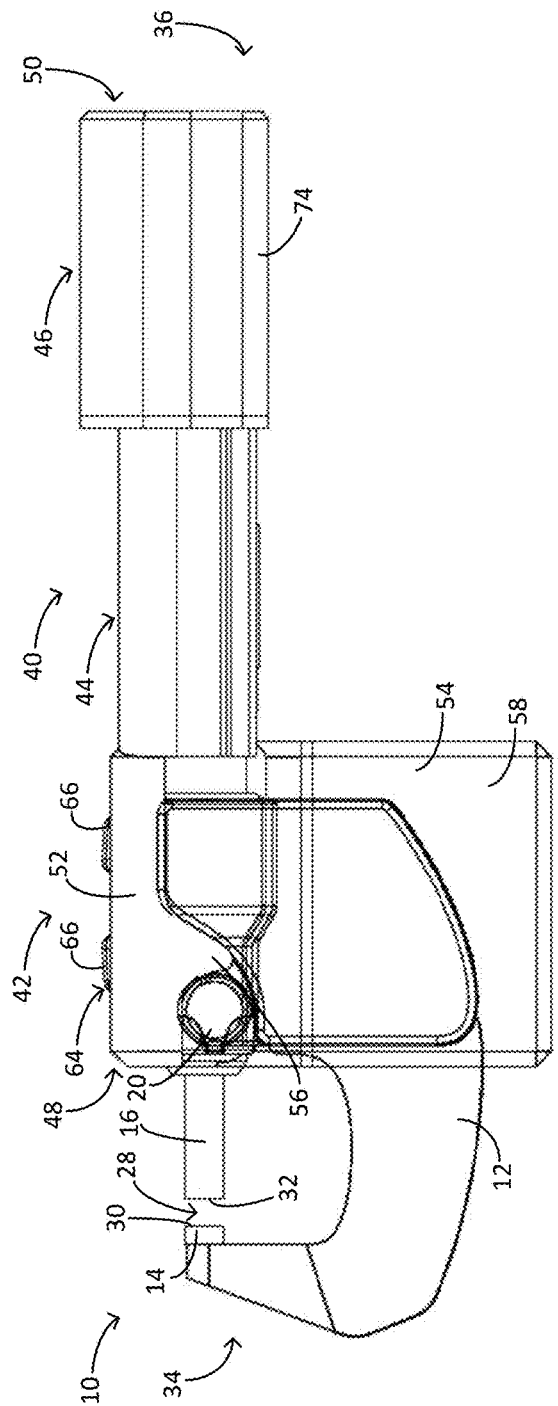

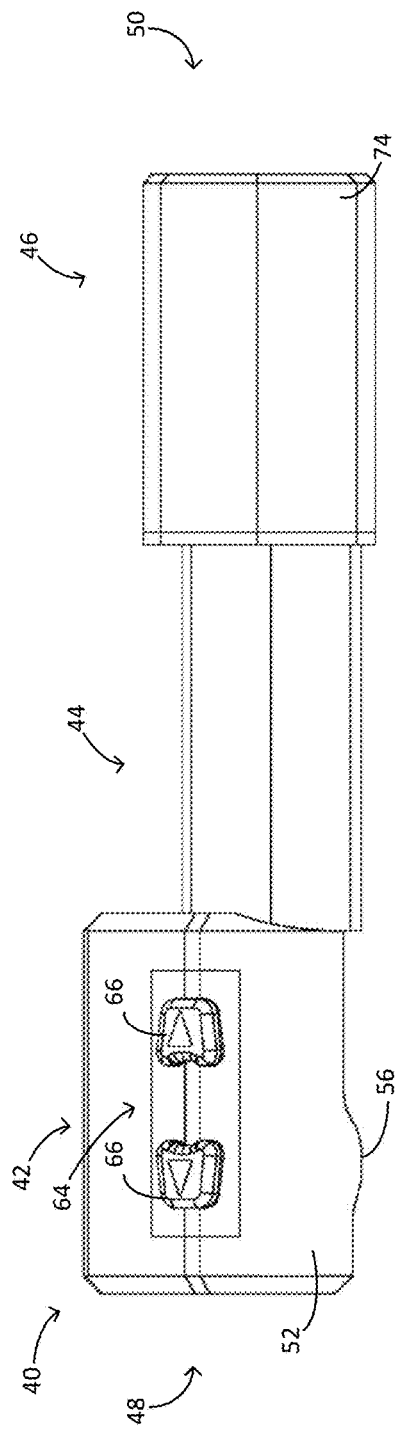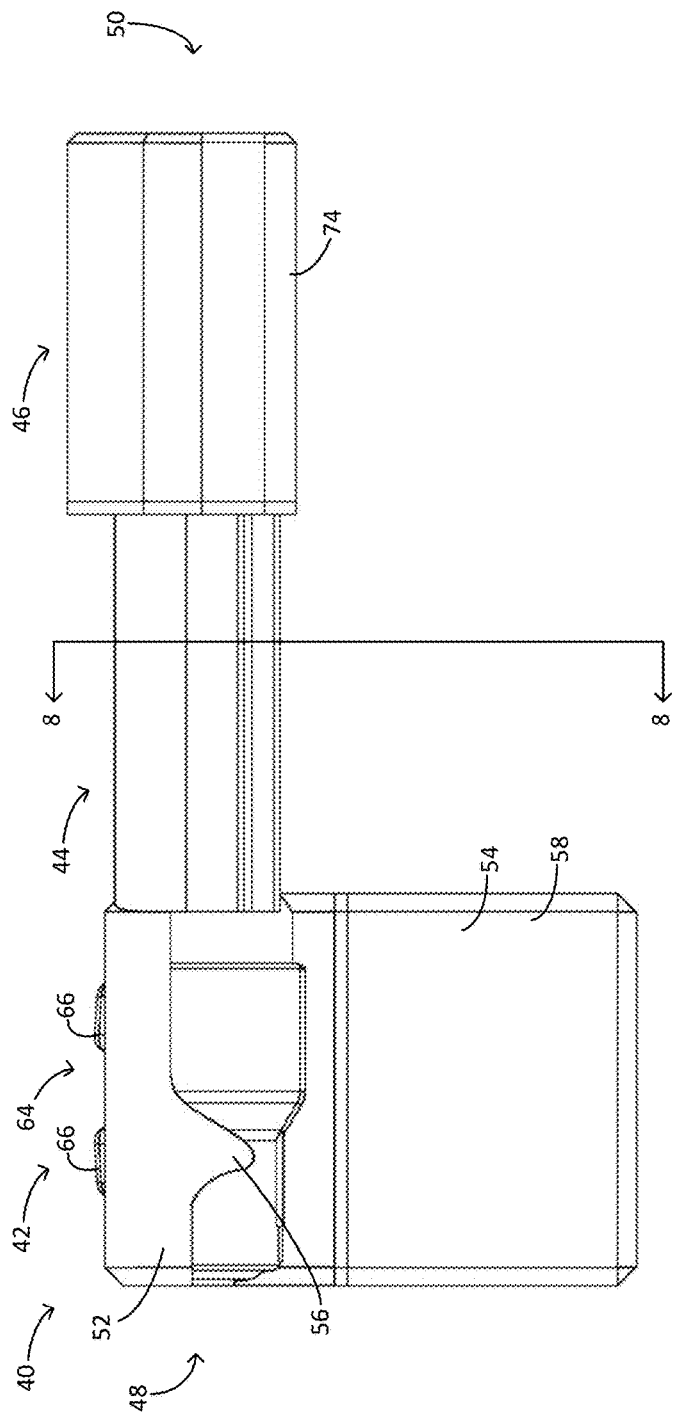

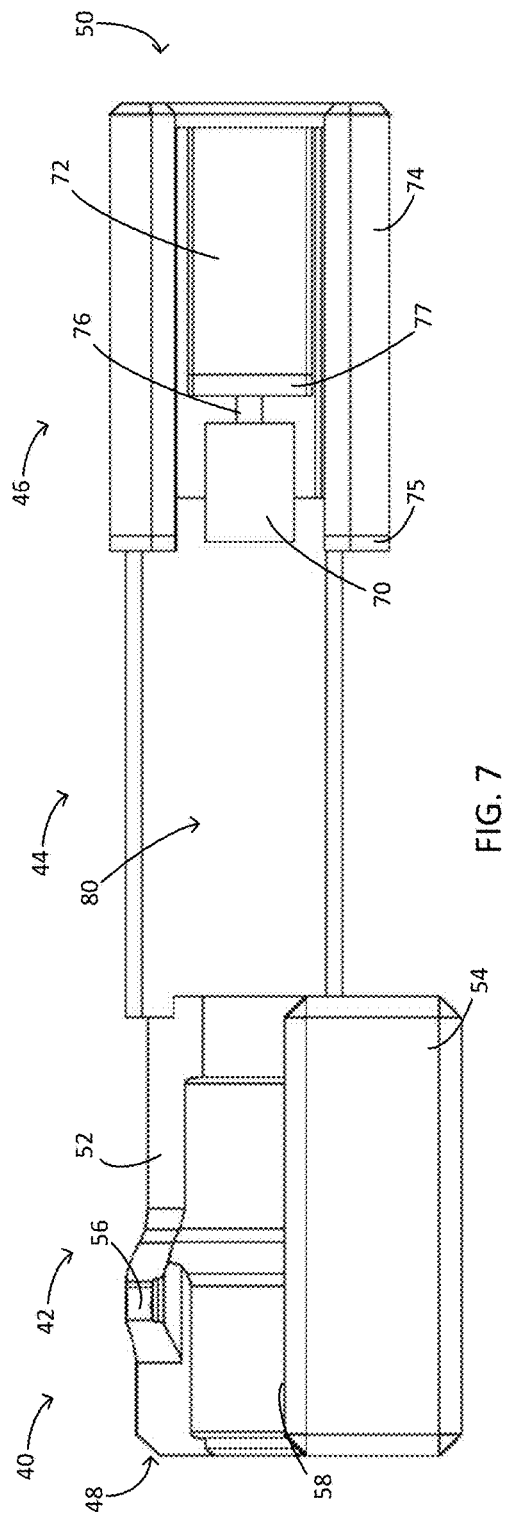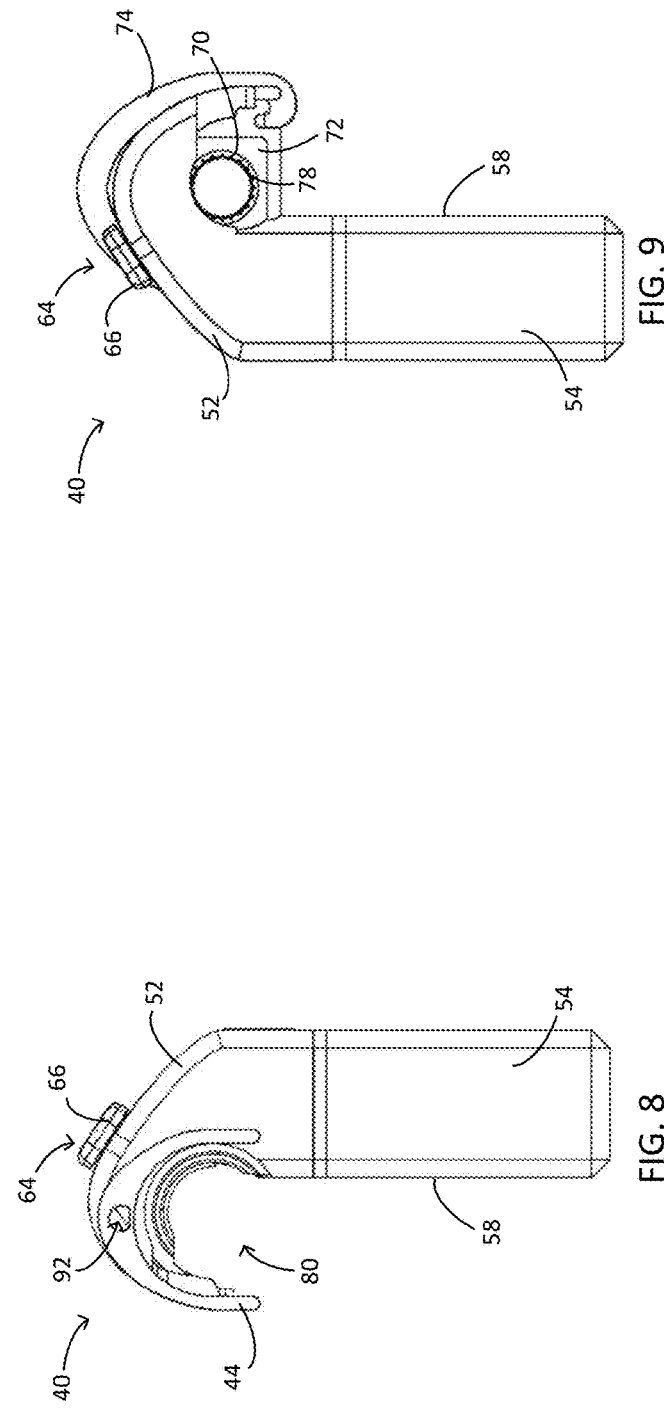

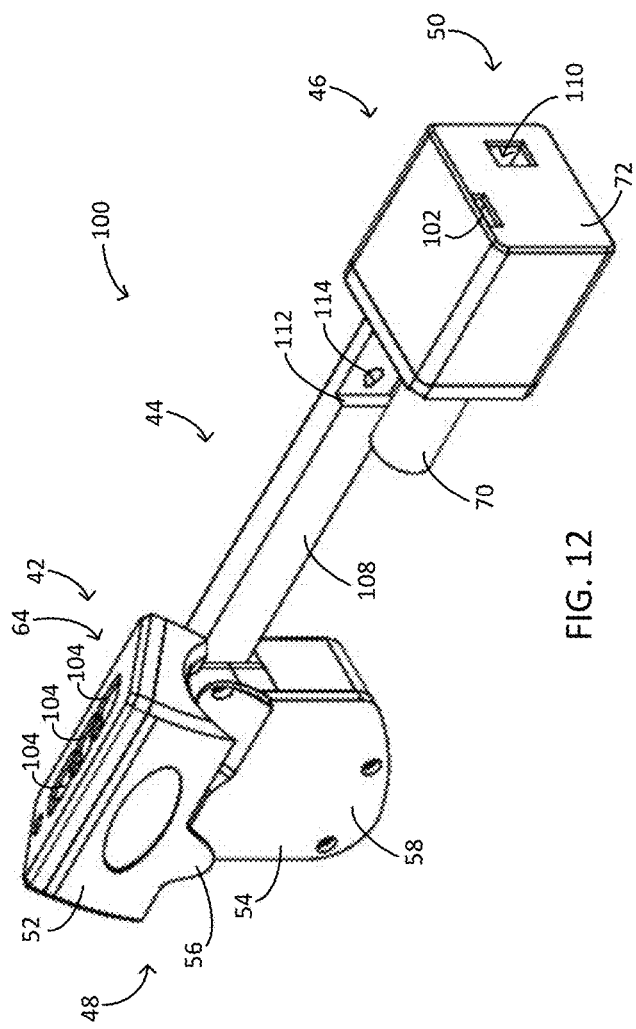
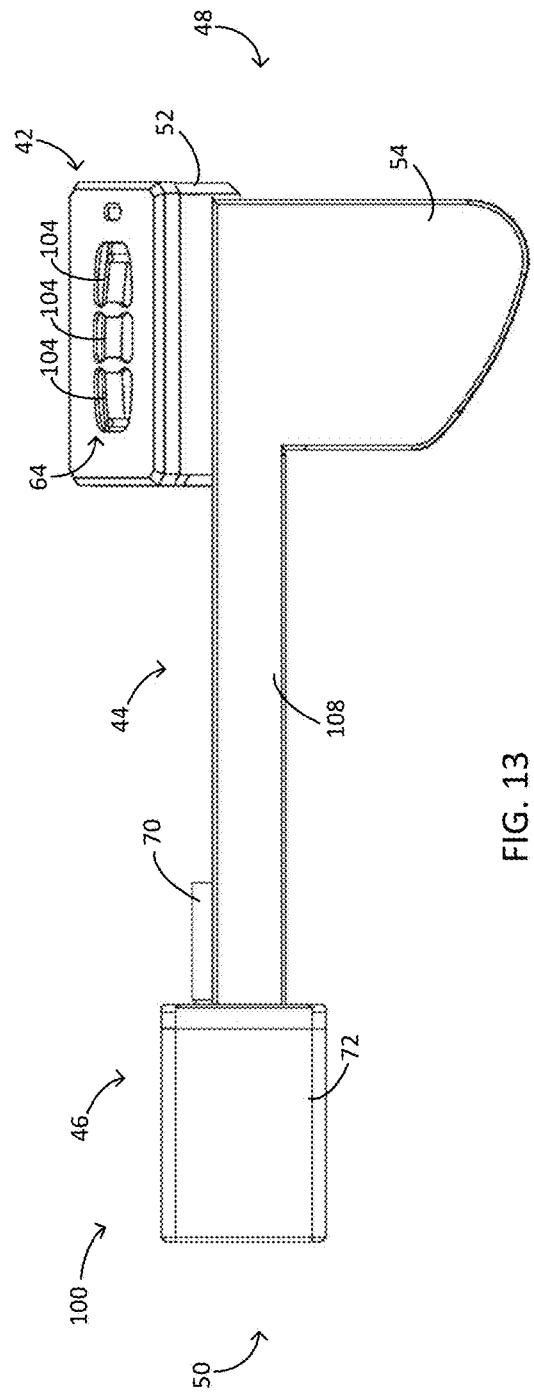
FIG. 12
FIG. 13

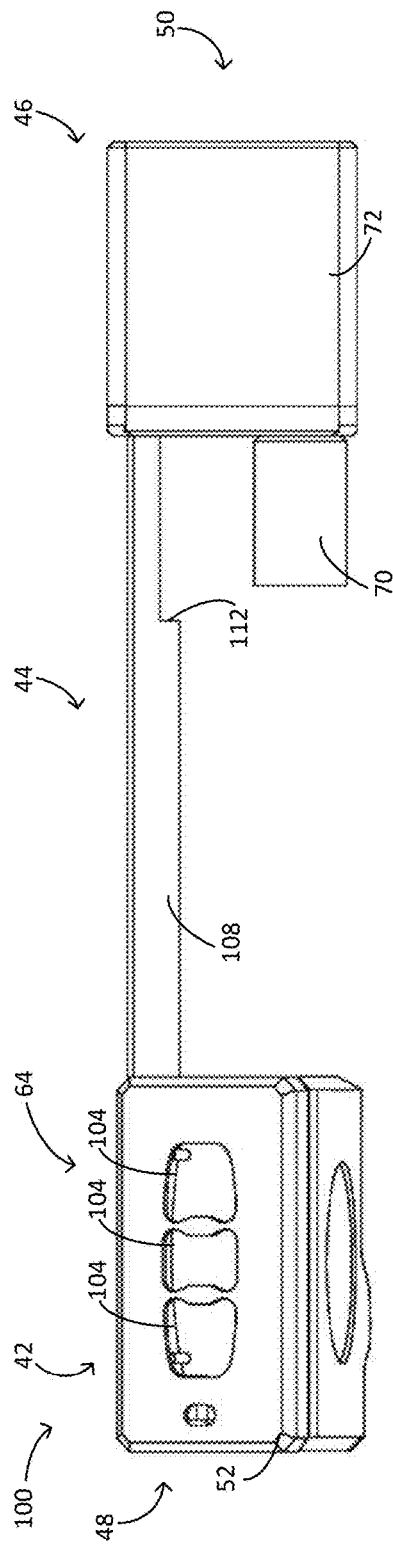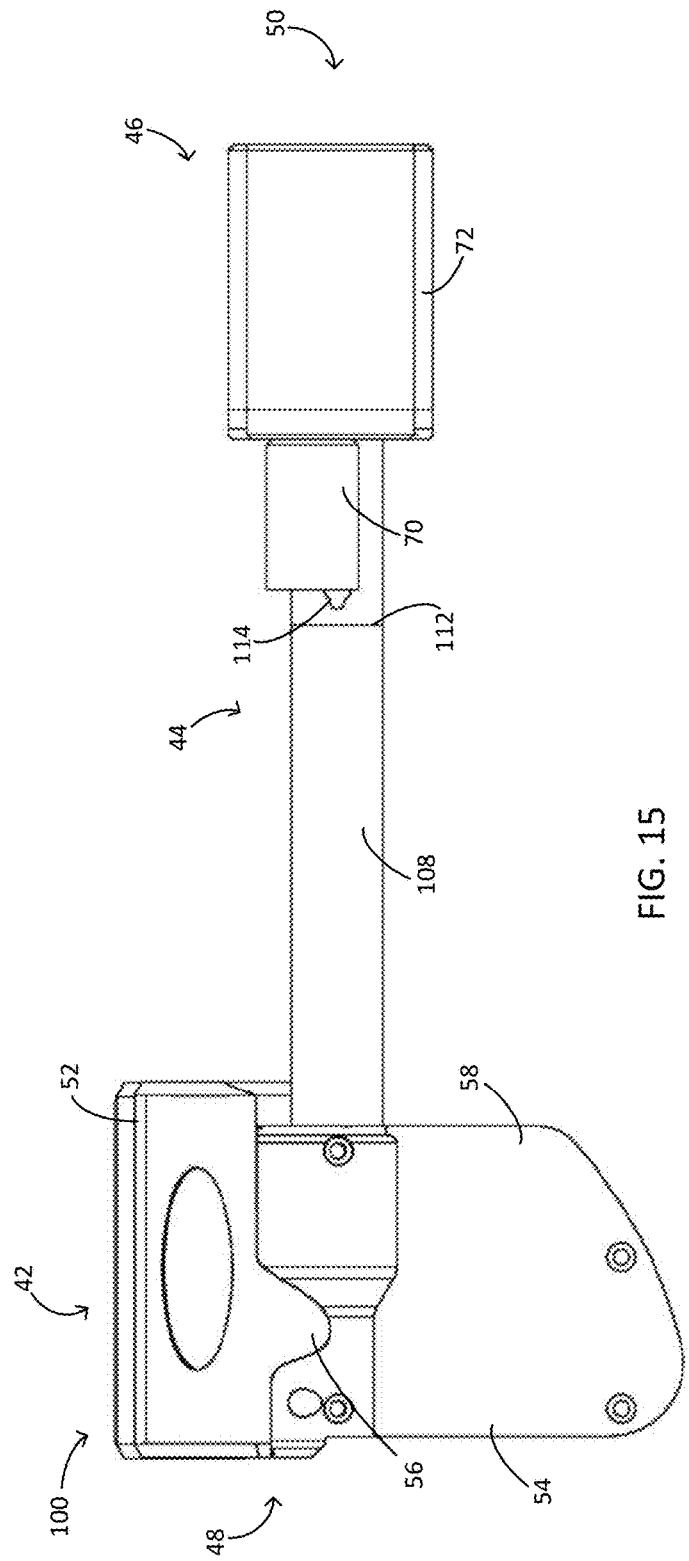

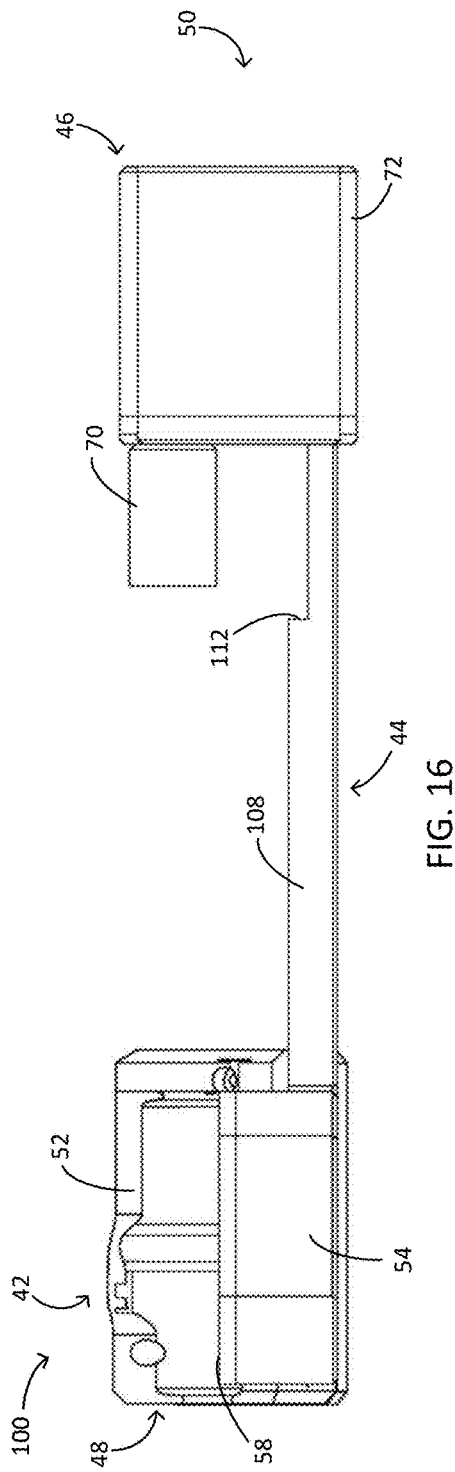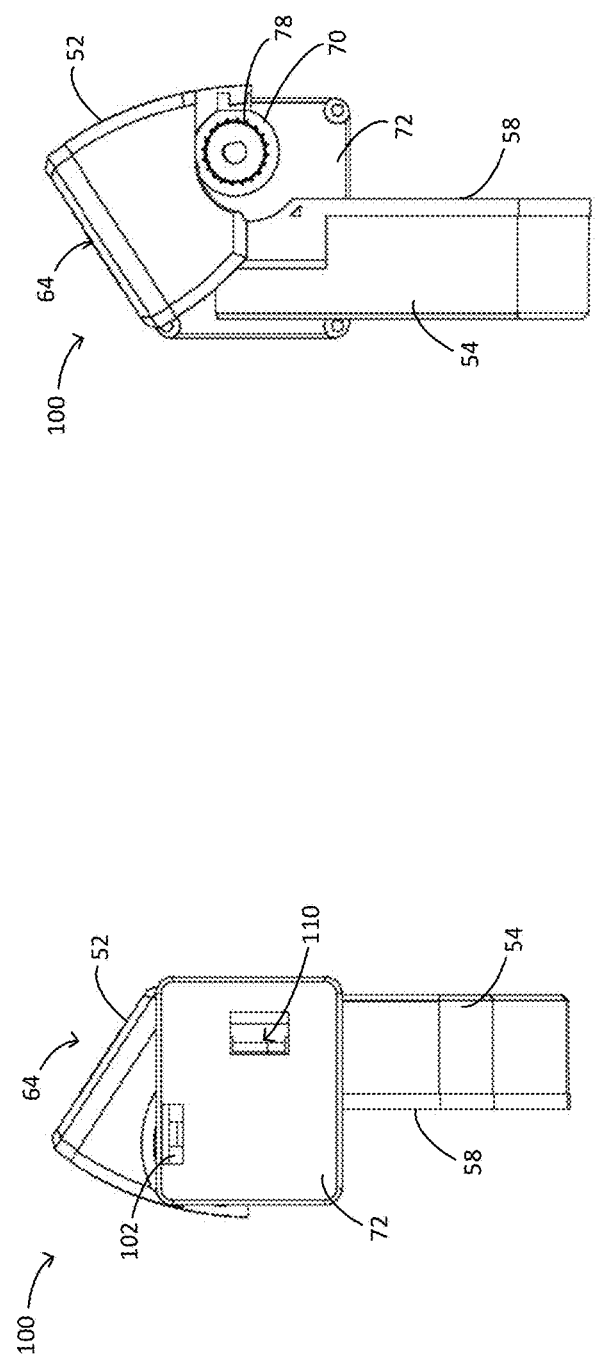

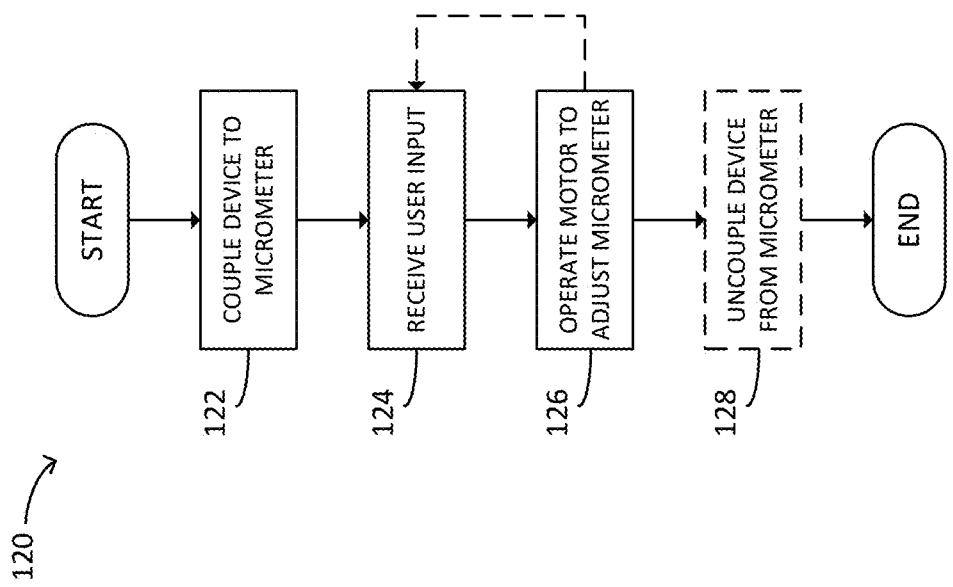

MICROMETER DRIVER SYSTEM AND METHOD

BACKGROUND

A micrometer is often used by an operator to measure an object in a manner that requires the operator to hold the object while adjusting the micrometer. If the micrometer is adjusted by a rotary dial on its distal end away from its measuring calipers, it can be difficult for the operator to obtain a measurement while also holding the object. Such difficulty can affect the speed at which the operator takes measurements and, in some cases, the accuracy of the measurements as well. Thus, there is a need for devices and methods for improving ease, speed, and accuracy of micrometer measurements.

SUMMARY

Some embodiments provide a device for driving a micrometer. The device includes a first body, a second body, and a rail portion. The first body is configured to be coupled to a frame of the micrometer. The second body is configured to be coupled to a ratchet of the micrometer and to rotate the ratchet. The rail portion is coupled between the first body and the second body, and the second body is slidable along the rail portion.

Some embodiments provide a device for driving a micrometer. The device includes a body, a collet, a motor, and a controller. The body is configured to be coupled to a frame of the micrometer. The collet is configured to be coupled to a ratchet of the micrometer and to rotate the ratchet. The motor is coupled to the collet and rotates the collet to rotate the ratchet. The controller controls operation of the motor.

Some embodiments provide a method for automatically driving a micrometer using a device coupled to the micrometer. The method includes receiving user input via a user interface of the device, and operating a motor of the device to rotate a ratchet of the micrometer to drive the micrometer in a first direction in response to the user input.

DESCRIPTION OF THE DRAWINGS

FIG. 1 is a front view of an example micrometer.

FIG. 2 is a front view of a device, according to some embodiments, coupled to a micrometer.

FIG. 5 is a topside view of the device of FIG. 2.

FIG. 6 is another front view of the device of FIG. 2.

FIG. 7 is an underside view of the device of FIG. 2.

FIG. 8 is a cross-sectional view of the device of FIG. 2 taken from line 8-8 in FIG. 6.

FIG. 9 is a side view of the device of FIG. 2.

FIG. 12 is an isometric view of a device, according to some embodiments, configured to be coupled to a micrometer.

FIG. 13 is a rear view of the device of FIG. 12.

FIG. 14 is a topside view of the device of FIG. 12.

FIG. 15 is a front view of the device of FIG. 12.

FIG. 16 is an underside view of the device of FIG. 12.

FIG. 17 is a first side view of the device of FIG. 12.

FIG. 18 is a second side view of the device of FIG. 12.

FIG. 20 is a method of operating a device with a micrometer, according to some embodiments.

DETAILED DESCRIPTION

Figure 3:
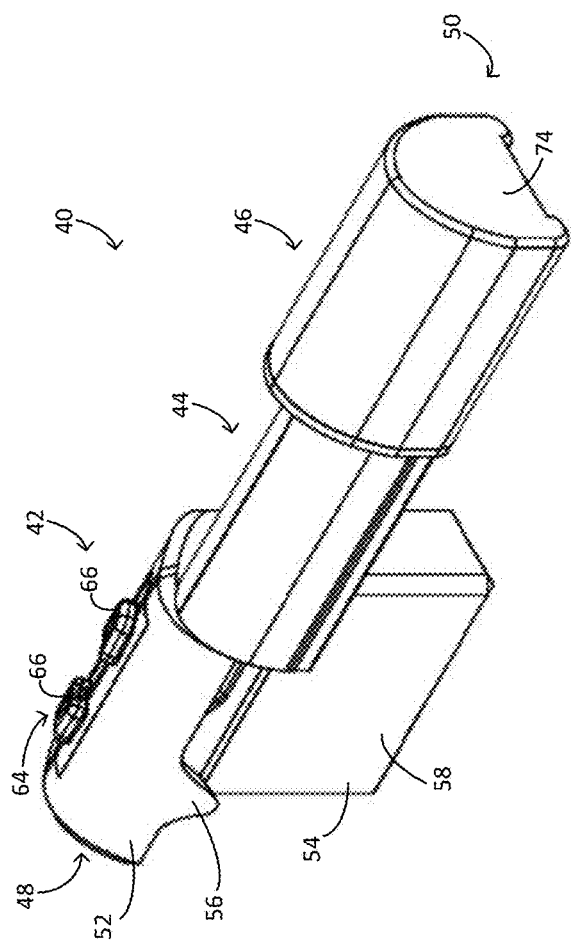
FIG. 3 is an isometric view of the device of FIG. 2.
Figure 4:
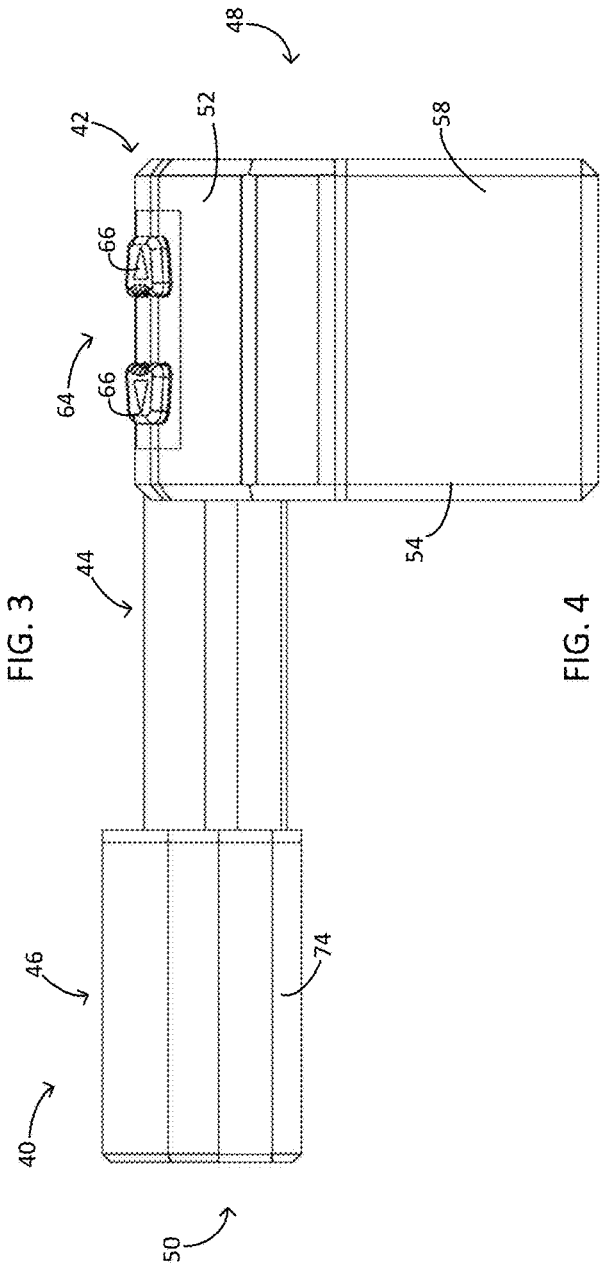
FIG. 4 is a rear view of the device of FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a micrometer 10, which can include a frame 12, an anvil 14, a spindle 16, a sleeve 18, a lock nut 20, a thimble 22, a ratchet 24, and, optionally, an interface 26. Generally, the micrometer 10 is used by an operator to measure an object (not shown) between the anvil 14 and the spindle 16. For example, the operator places the object in a space 28 between the anvil 14 and the spindle 16, and adjusts, e.g., rotates, the ratchet 24 (or the thimble 22) with their fingers to cause the spindle 16 to move toward the anvil 14 until respective faces 30, 32 of the anvil 14 and the spindle 16 contact the object.

As shown in FIG. 1, the anvil 14 and the spindle 16 are located at a first end 34 of the micrometer 10, while the ratchet 24 is located at a second, opposite end 36 of the micrometer 10. Often, to measure an object, an operator must hold the object and the frame 12 while also trying to rotate the ratchet 24, which can be difficult. Furthermore, in some applications, the heat of the operator's hand gripping the micrometer 10 while holding and rotating the ratchet 24 may affect tolerances of the micrometer 10.

In light of these shortcomings, some embodiments provide a device that allows an operator to adjust a micrometer using buttons instead of the traditional rotary dial or ratchet. More specifically, the device can retrofit onto an existing micrometer, for example, by snapping a main body of the device onto the hand-held frame portion of the micrometer. The device includes a distal collet that connects to the ratchet of the micrometer. The collet is rotated by a motor when an operator presses one of the buttons on the main body which, in turn, rotates the ratchet and moves the spindle of the micrometer toward the anvil.

More specifically, FIGS. 2-10 illustrate a device 40 according to some embodiments. The device 40 can include a main body 42 (e.g., a first body), a rail portion 44, and a motor body 46 (e.g., a second body). The main body 42 can be coupled to the motor body 46 via the rail portion 44, and the motor body 46 can be movable or slidable relative to or along the rail portion 44. Furthermore, as shown in FIG. 2, the main body 42 can be coupled to the frame 12 of a micrometer 10, and the motor body 46 can be coupled to the ratchet 24 of the micrometer 10. Accordingly, the main body 42 can be located at a first end 48 of the device 40, associated with the first end 34 of the micrometer 10, and the motor body 46 can be located at a second end 50 of the device 40, associated with the second end 36 of the micrometer 10.

In some embodiments, as shown in FIGS. 2-10, the main body 42 can include a cover 52 and an electronics housing 54, which may be made of plastic or another suitable material(s). The cover 52 can be configured to be coupled to the frame 12 of the micrometer 10, such as to at least a top of the frame 12. In some embodiments, the cover 52 can be sized and shaped to snap onto the frame 12 via a friction fit. For example, as shown in FIGS. 3, 7, 9, and 10, the cover 52 can be substantially curved to snap over and around the top of the frame 12. Additionally, in some embodiments, the cover 52 can include one or more features, such as protrusions, indentations, etc., to facilitate properly positioning and coupling the cover 52 to the micrometer 10 when the cover 52 is snapped onto the frame 12. For example, as shown in FIGS. 2, 3, 6, and 10, the cover 52 can include a protrusion 56 that sits adjacent to the lock nut 20 when the cover 52 is properly coupled to the frame 12 (as shown in FIG. 2).

Figure 10:
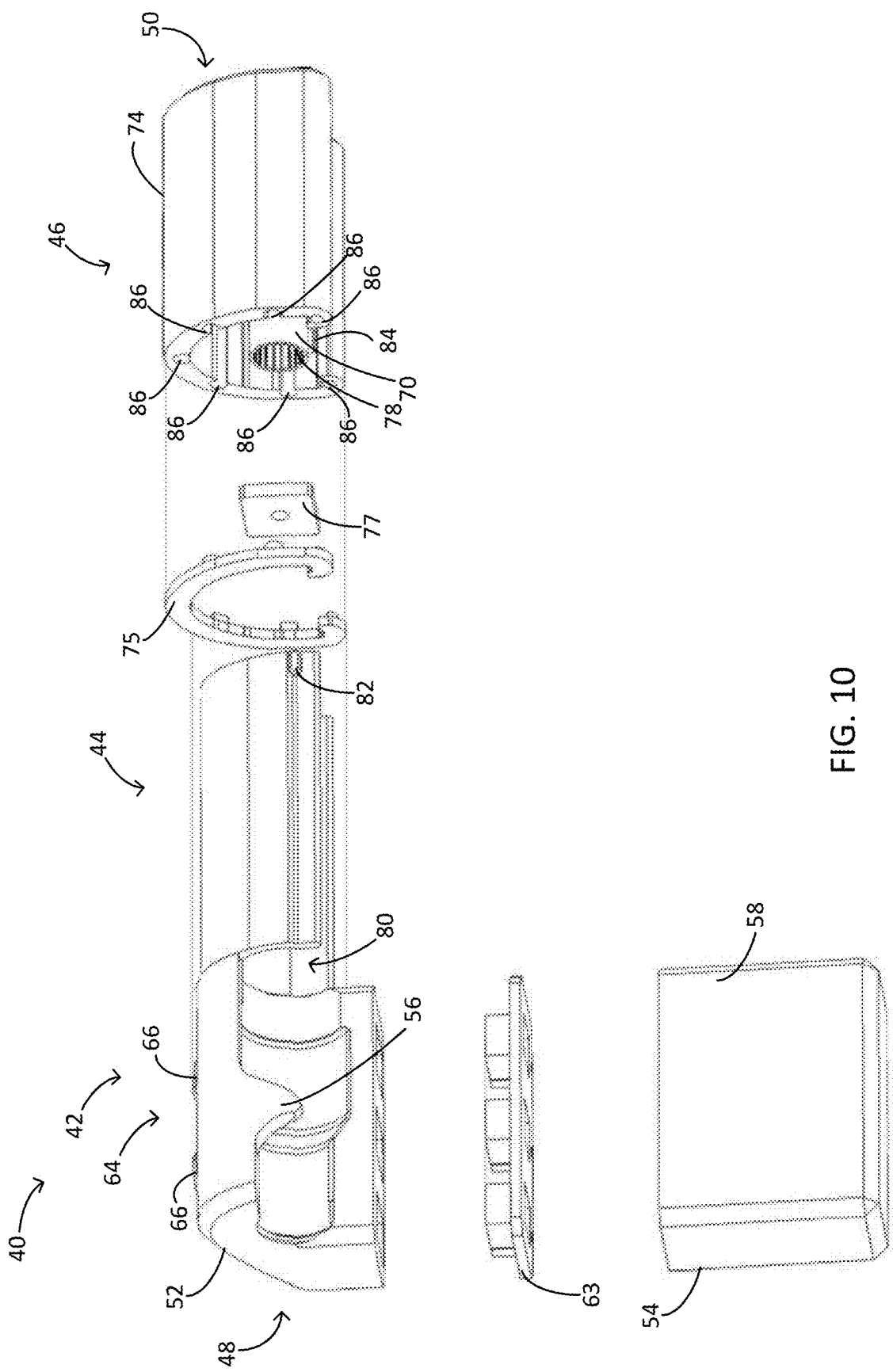
FIG. 10 is an exploded parts view of the device of FIG. 2.

Furthermore, the electronics housing 54 can be coupled to or integral with the cover 52. For example, the electronics housing 54 can extend downward from the cover 52 so that the electronics housing 54 contacts and lies against the frame 12 of the micrometer 10 (e.g., a front face 58 of the electronics housing 54 lies against a back of the frame 12) when the cover 52 is coupled to the frame 12. The electronics housing 54 can house electronics such as, but not limited to, a controller 60, such as a microprocessor, and a power source 62, such as a battery, as shown schematically in FIG. 11 and discussed further below. In some embodiments, as shown in FIG. 10, the device 40 can include a contacts cover 63 between the cover 52 and the electronics housing 54. The contacts cover 63 can include electrical contacts for connection to the electronics and/or power source 62 within the electronics housing 54. Additionally, in some embodiments, the electronics housing 54 can be removably coupled to the cover 52, such that the electronics housing 54 can be removed to provide access to the internal electronics, such as the battery 62 for replacement. In other embodiments, the electronics housing 54 can be permanently or integrally coupled to the cover 52. In such embodiments, the battery 62 can accessed via a removable cover portion (not shown) for replacement or can be rechargeable via an external charging contact or a port on the electronics housing 54, the cover 52, or another component of the device 40. For example, in one embodiment, the battery can be a rechargeable ion battery and the device 40 can include a USB charging port to permit battery charging via a USB power cable.

As shown in FIGS. 2-6, 9, and 10, the main body 42 can further include a user interface 64 to receive user input for controlling the device 40 and, in turn, controlling movement of the micrometer 10. In some embodiments, the user interface 64 includes a plurality of buttons 66 located on the cover 52 or another portion of the device 40. In one embodiment, the plurality of buttons 66 are silicon buttons. By locating the user interface 64 on the main body 42, an operator can hold the micrometer frame 12 and the main body 42 together in one hand, while further providing user input with the same hand. As such, the device 40 can facilitate one-handed operation of the micrometer 10 via the user interface 64 located adjacent the frame 12 instead of the traditional manner of manually rotating the ratchet 24, which is located distal from the frame. This easy, automatic operation through the user interface 64 can improve speed and accuracy of the micrometer 10.

That is, the user interface 64 is in communication with the controller 60 such that, when an operator presses one or more buttons 66, the controller 60 controls operation of a motor 68 within the motor body 46 to adjust the micrometer 10, as further described below. FIGS. 2-6 and 10 illustrate two buttons 66 on the cover 52, such as a first button 66 that controls micrometer movement in a first direction when pressed (e.g., bringing the faces 30, 32 of the anvil 14 and the spindle 16 toward one another), and a second button 66 that controls micrometer movement in a second direction when pressed (e.g., bringing the faces 30, 32 of the anvil 14 and the spindle 16 away from one another). In some embodiments, the plurality of buttons 66 can further include a third button 66 that controls automatic cycling when pressed. During automatic cycling, the micrometer 10 can be moved in the first direction until the respective faces 30, 32 of the anvil 14 and the spindle 16 contact an object therebetween. Additionally, in some embodiments, different combinations or patterns of pressing buttons may cause different outcomes. For example, in one embodiment, rather than a third button 66 for automatic cycling, automatic cycling can be initiated by the user pressing the first button 66 and the second button 66 simultaneously.

With reference now to the motor body 46, generally, the motor body 46 can be configured to be coupled to a ratchet 24 of a micrometer 10 and rotate the ratchet 24. For example, in some embodiments, the motor body 46 can house a motor 68, shown schematically in FIG. 11, and can include a collet 70, shown in FIGS. 7, 9, and 10, rotationally driven by the motor 68. In some embodiments, the motor body 46 can include the motor 68, the collet 70, a motor housing 72 that houses the motor 68, and a cover 74 that at least partially covers the motor housing 72 and the collet 70. In some embodiments, the motor body 46 can be made of plastic or another suitable material(s).

As shown in FIG. 7, collet 70 can be rotationally coupled to the motor 68 within the motor housing 72 via a shaft 76 (which extends through a motor housing cover 77) such that rotation of the motor 68 causes rotation of the collet 70 via the shaft 76. Furthermore, the collet 70 can be coupled to the ratchet 24 of the micrometer 10 such that rotation of the collet 70 causes rotation of the ratchet 24. For example, in some embodiments, the collet 70 can be slid over at least a portion of the ratchet 24. That is, once the device 40 is snapped onto the frame 12 of the micrometer 10, the collet 70 can be slid over the ratchet 24 to engage the ratchet 24. In some embodiments, as shown in FIGS. 9 and 10, the collet 70 can include internal threading 78 or a substantially rough internal surface to better engage and grip the ratchet 24 in order to facilitate its rotation. Alternatively, in some embodiments, the collet 70 may be replaced by a sleeve, band, flange, collar, or other mechanical coupling that can translate motor rotation to ratchet rotation.

Accordingly, motor operation causes the collet 70 to rotate and, in turn, rotates the ratchet 24 of the micrometer 10. Rotation can be performed in either direction and, thus, can move the ratchet 24 toward or away from the first end 34 of the micrometer 10, resulting in the spindle 16 moving toward or away from the first end 34 of the micrometer 10. Such movement of the ratchet 24 in response to rotation can cause the entire motor body 46 to also be moved toward or away from the first end 48 of the device 40, for example, by sliding along the rail portion 44. More specifically, the motor body 46 can slide along the rail portion 44 in a first linear direction (e.g., toward the first end 34 of the micrometer 10) when the ratchet 24 is rotated by the motor 68 in a first rotational direction, such as when a first button 66 is pressed. And the motor body 46 can slide along the rail portion 44 in a second, opposite direction (e.g., away from the first end 34 of the micrometer 10) when the ratchet 24 is rotated by the motor 68 in a second, opposite rotational direction, such as when a second button 66 is pressed.

Referring now to the rail portion 44, in some embodiments, as shown in FIGS. 2-10, the rail portion 44 is coupled to or integral with the main body 42 and extends away from the main body 42 toward the second end 50 of the device 40. The rail portion 44 can be made of plastic or another suitable material(s). In some embodiments, as shown in FIGS. 7, 8, and 10, the rail portion 44 can be substantially semicircular or U-shaped in cross-section defining an open space 80. The motor cover 74 can extend over the semicircular rail portion 44 and the collet 70 can be positioned within the open space 80. As such, when the device 40 is coupled to a micrometer 10, the rail portion 44 can extend over the collet 70 as well as the ratchet 24, the thimble 22, and/or the sleeve 18 of the micrometer 10. In this manner, the rail portion 44 can protect the rotating and/or moving parts of the micrometer 10 within the open space 80.

As noted above, the motor body 46 can slide relative to the rail portion 44 during operation of the device 40. According to some embodiments, the rail portion 44 and the motor body 46 can include a sliding track configuration to enable such movement; however, other configurations can be utilized in some embodiments to enable such movement. For example, as shown in FIG. 10, the rail portion 44 can include end protrusions 82 and the motor cover 74 can include tracks 84. The end protrusions 82 of the rail portion 44 can be received within and slide relative to the tracks 84. In some embodiments, as shown in FIG. 10, the tracks 84 may be closed, i.e., may not extend all the way to an end of the motor cover 74 in order to substantially prevent or hinder the motor cover 74 from be pulled off of the rail portion 44. Additionally, as shown in FIGS. 7 and 10, the motor housing 72 can include a motor housing cover 75 that closes off the tracks 84. However, in other embodiments, the tracks 84 can fully extend to the end of the motor cover 74. Additionally, in some embodiments, as shown in FIG. 10, the motor cover 74 can include linear bearings, such as ball bushings (not shown) housed within bearing sections 86, to support the motor body 46 sliding along the rail portion 44. In some embodiments, the protrusions 82 may be housed on the motor cover 74 while the rail portion 44 includes tracks 84. Furthermore, in some embodiments, other configurations can be used to enable the motor body 46 to slide relative to the rail portion 44.

Figure 11:
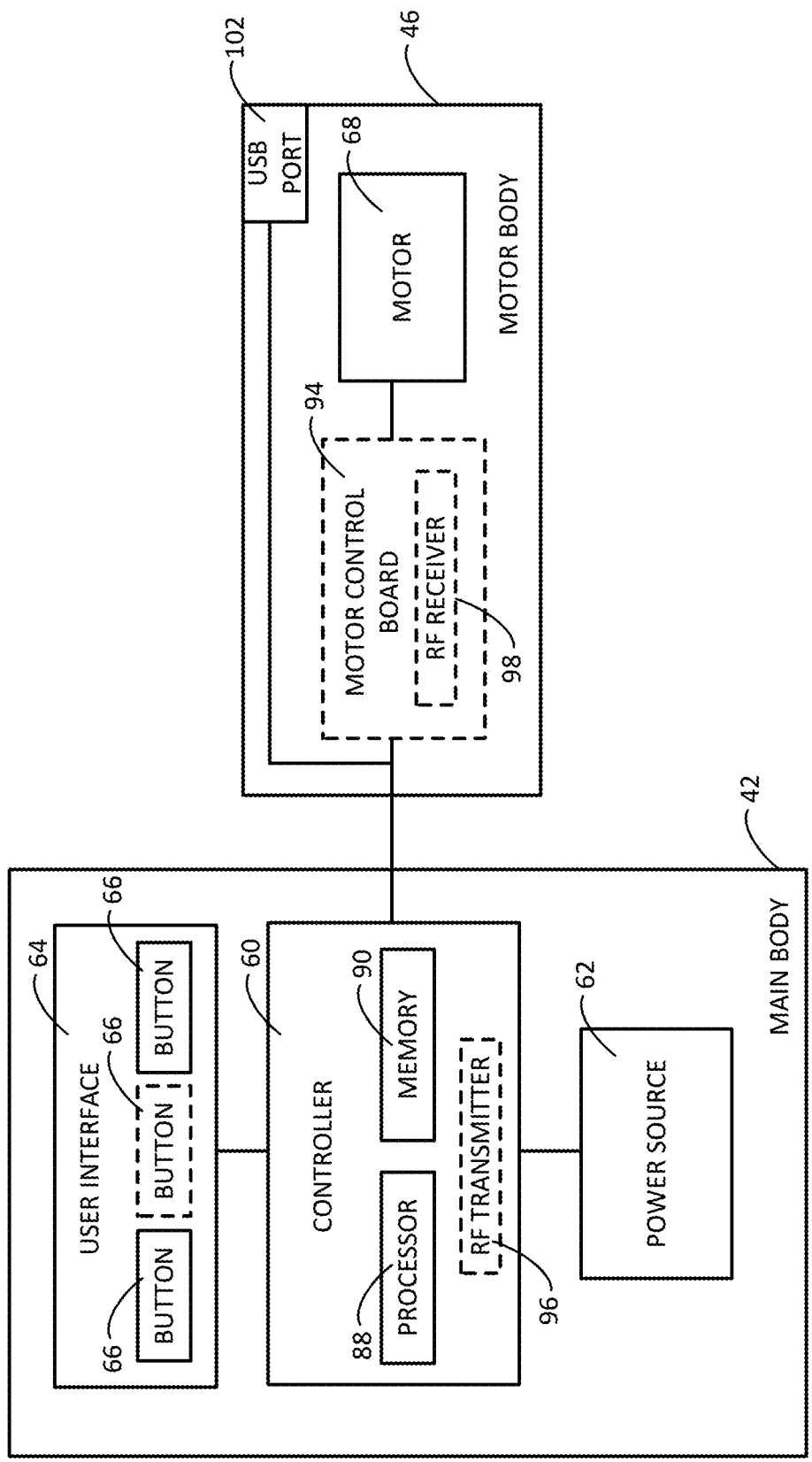
FIG. 11 is a schematic view of components of a device, according to some embodiments, such as the device of FIG. 2 or the device of FIG. 12.

Turning now to FIG. 11, internal components of the device 40 of some embodiments are schematically shown. As shown in FIG. 11, the device 40 can include the controller 60, the power source 62, the user interface 64 including one or more buttons 66, and the motor 68. In some embodiments, the user interface 64, the controller 60, and the power source 62 can be housed within or on the main body 42 while the motor 68 and an optional motor control board 94, described further below, can be housed within the motor body 46. In one embodiment, the motor 68 can be a 500 rotations-per-minute (RPM) direct current (DC) motor. However, other types and sizes of DC or alternating current (AC) motors can be used in some embodiments, including, but not limited to, servo motors and stepper motors.

Still referring to FIG. 11, in some embodiments, the controller 60 can include a processor 88 and memory 90 (e.g., non-transitory computer-readable media) storing instructions that can be carried out by the processor. The controller can be in communication with the user interface 64 in order to receive user inputs from the user interface 64 (e.g., when an operator presses one or more of the buttons 66), can be powered by the power source 62, and can be in communication with the motor 68 in order to control operation of the motor 68 based on the user inputs, e.g., based on instructions stored in the memory 90 and carried out by the processor 88. In some embodiments, the controller 60 can include a wired connection from the power source 62 through the rail portion 44 to the motor 68 in order to control operation of the motor 68. For example, wires (not shown) can be routed from the controller 60 through an internal pathway 92 of the rail portion 44, as shown in FIG. 8.

In other embodiments, the controller 60 can wirelessly connect to and control the motor 68. For example, in such embodiments, as shown in FIG. 11, the motor body 46 can house an electronics board, e.g., a motor control board 94. The controller 60 can include a wireless transmitter, such as a radio frequency (RF) transmitter 96, and the motor control board 94 can include a wireless (e.g., RF) receiver 98 to enable wireless communication and control between the controller 60 and the motor 68.

FIGS. 12-19 illustrate another device 100 according to some embodiments. The device 100 of FIGS. 12-19 can include similar components as the device 40 of FIGS. 2-10 described above and, thus, like reference numerals may refer to like components. Furthermore, unless otherwise indicated, any description above of components of the device 40 may also apply to the device 100. For example, internal components of device 100, according to some embodiments, are shown in FIG. 11 and described above.

Accordingly, as shown in FIGS. 12-19, the device 100 can include a main body 42, a rail portion 44, and a motor body 46. The main body 42 can be coupled to the motor body 46 via the rail portion 44, and the motor body 46 can be movable relative to or along the rail portion 44. Furthermore, the main body 42 can be coupled to the frame 12 of a micrometer 10, and the motor body 46 can be coupled to the ratchet 24 of the micrometer 10. Accordingly, the main body 42 can be located at a first end 48 of the device 100, associated with the first end 34 of the micrometer 10, and the motor body 46 can be located at a second end 50 of the device 100, associated with the second end 36 of the micrometer 10.

In some embodiments, as shown in FIGS. 12-19, the main body 42 can include a cover 52 and an electronics housing

54. The cover 52 can be coupled to the frame 12 of the micrometer 10, such as to at least a top of the frame 12. In some embodiments, the cover 52 can be sized and shaped to snap onto the frame 12. For example, as shown in FIGS. 12 and 18, the cover 52, can be substantially curved to snap over and around the top of the frame 12. More specifically, in some embodiments, the cover 52 can be rotatable relative to the electronics housing 54. As a result, the cover 52 can be rotated upward in an "open" position, as shown in FIGS. 12-18, and then rotated downward into a "closed" position over a top of the frame 12 in order to couple the cover 52 to the frame 12 via a snap-fit connection. Additionally, in some embodiments, the cover 52 can include one or more features, such as protrusions 56, indentations, etc., to facilitate properly positioning and coupling the cover 52 to the micrometer 10 when the cover 52 is snapped onto the frame 12.

Furthermore, the electronics housing 54 can be coupled to or integral with the cover 52. For example, the electronics housing 54 can extend downward from the cover 52 so that the electronics housing 54 contacts and lies against the frame 12 (e.g., a front face 58 of the electronics housing 54 lies against a back of the frame 12) when the cover 52 is coupled to the frame 12. Also, in some embodiments, the electronics housing 54 can be sized similar to the frame 12 to generally align with the frame 12 when the device 100 is coupled to the micrometer 10.

The electronics housing 54 can house electronics such as, but not limited to, a controller 60 and a power source 62, such as a battery, as shown schematically in FIG. 11 and described above. In some embodiments, the electronics housing 54 can be removably coupled to the cover 52, such that the electronics housing 54 can be removed to provide access to, e.g., the battery 62 for replacement. In other embodiments, the electronics housing 54 can be permanently or integrally coupled to the cover 52. In such embodiments, the battery 62 can accessed via a removable cover portion (not shown) for replacement or can be rechargeable via an external charging contact or a port on the electronics housing 54, the cover 52, or another component of the device 100. For example, in one embodiment, the battery 62 can be a rechargeable ion battery and, as shown in FIGS. 11 and 17, the motor body 46 can include a USB charging port 102 to permit battery charging via a USB power cable. Accordingly, wiring (not shown) can be routed from the USB charging port 102 on the motor body 46 to the power source 62 in the electronics housing 54. However, in other embodiments, the USB charging port 102 can be located on the main body 42.

As shown in FIGS. 12-14, the main body 42 can further include user interface 64 to control the device 100 and, in turn, control movement of the micrometer 10. In some embodiments, the user interface 64 includes a plurality of buttons located on the cover 52 or another portion of the device 100. For example, FIGS. 12-14 illustrate the cover 52 including openings 104 through which buttons, such as silicon buttons, can extend (like the buttons 66 illustrated in FIGS. 2-6, 9, and 10). As described above, generally, the user interface 64 is in communication with the controller 60 such that, when an operator presses one or more buttons 66, the controller 60 controls operation of a motor 68 within the motor body 46 to adjust the micrometer 10.

FIGS. 12-14 illustrate three button openings 104 on the cover 52, such as a first button opening 104 for a first button that controls micrometer movement in a first direction when pressed (e.g., bringing the faces 30, 32 of the anvil 14 and the spindle 16 toward one another), and a second button opening 104 for a second button that controls micrometer movement in a second direction when pressed (e.g., bringing the faces 30, 32 of the anvil 14 and the spindle 16 away from one another), and a third button opening 104 for a third button that controls automatic cycling when pressed. Additionally, in some embodiments, different combinations or patterns of pressing buttons may cause different outcomes.

Figure 19:
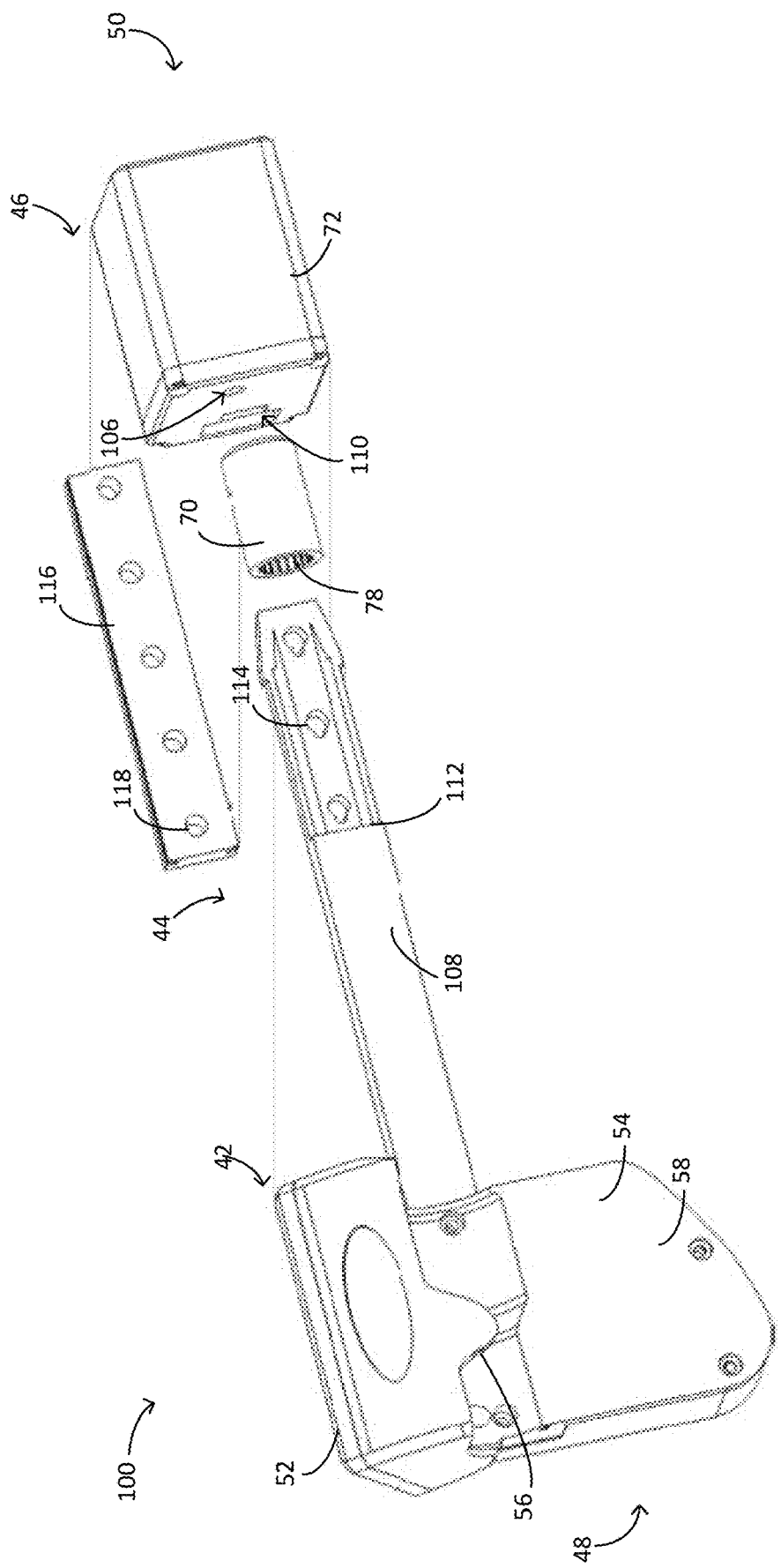
FIG. 19 is an exploded parts view of the device of FIG. 12.

With reference now to the motor body 46, generally, the motor body 46 can house a motor 68, shown schematically in FIG. 11, and can include a collet 70, shown in FIGS. 12-16, 18, and 19, rotationally driven by the motor 68. In some embodiments, the motor body 46 can include the motor 68, the collet 70, and a motor housing 72 that houses the motor 68. The collet 70 can be rotationally coupled to the motor 68 within the motor housing 72 via a shaft (not shown) such that rotation of the motor 68 causes rotation of the collet 70 via the shaft 76. For example, FIG. 19 illustrates a shaft opening 106 through which the motor shaft can extend and engage the collet 70. Furthermore, the collet 70 can be coupled to the ratchet 24 of the micrometer 10 such that rotation of the collet 70 causes rotation of the ratchet 24. For example, in some embodiments, the collet 70 can be slid over at least a portion of the ratchet 24. That is, once the device 100 is snapped onto the frame 12 of the micrometer 10, the collet 70 can be slid over the ratchet 24 to engage the ratchet 24. In some embodiments, as shown in FIGS. 18 and 19, the collet 70 can include internal threading 78 or a substantially rough internal surface to better engage and grip the ratchet 24 in order to facilitate its rotation.

Accordingly, motor operation causes the collet 70 to rotate and, in turn, rotates the ratchet 24 of the micrometer 10. Rotation can be performed in either direction and, thus, can move the ratchet 24 toward or away from the first end 34 of the micrometer 10, resulting in the spindle 16 moving toward or away from the first end 34 of the micrometer 10. Furthermore, the motor body 46 is moved toward or away from the first end 48 of the device 40 by sliding along the rail portion 44.

More specifically, in some embodiments, the rail portion 44 is coupled to or integral with the main body 42 and extends away from the main body 42 toward the second end 50 of the device 100. In some embodiments, as shown in FIGS. 12-16 and 19, the rail portion 44 can include a linear rail 108, which can be made of plastic or another suitable material(s). Additionally, in some embodiments, the linear rail 108 can be a single piece or can include more than one piece. For example, as shown in FIG. 19, the linear rail 108 can further include a metal rail portion 116. The metal rail portion 116 can be pressed up against the linear rail 108 so that it abuts a shoulder portion 112 of the linear rail 108 and respective holes 114, 118 of the linear rail 108 and the metal rail portion 116 are aligned, allowing for fasteners (such as screws, not shown) to extend through the holes 114, 118 to couple the components together. Furthermore, according to some embodiments, the rail portion 44 and the motor body 46 can include a sliding track configuration to allow the motor body 46 to slide relative to the rail portion 44 during operation of the device 100. For example, as shown in FIG. 19, the motor body 46 can include a rail opening 110 and the linear rail 108 can slide through the rail opening 110 to allow the motor body 46 to slide relative to the rail portion 44. Internally, the motor body 46 can include ball bearings (not shown) surrounding the rail opening 110 to facilitate smooth relative movement of the linear rail 108 relative to the motor body 46. As best shown in FIGS. 12-16 and 19, the linear rail 108 and the rail opening 110 can be rectangular or square in cross-section. However, in other embodiments, the linear rail 108 and the rail opening 110 can include other cross-sectional shapes. Furthermore, in some embodiments, other configurations can be used to enable the motor body 46 to slide relative to the rail portion 44.

In light of the above, some embodiments provide a method 120 for automatically driving a micrometer 10, as shown in FIG. 20. The method 120 may be carried out using the device 40 of FIGS. 2-10 or the device 100 of FIGS. 12-19. Generally, as shown in FIG. 20, the method 120 includes coupling the device 40/100 to a micrometer 10 (step 122); receiving user input (step 124); and operating the motor 68 to adjust the micrometer (step 126). At least some steps of the method 120, such as steps 124 and 126, may be carried out by the controller 60 (e.g., as instructions stored on memory 90 and carried out by the processor 88 of the controller 60).

More specifically, step 122 includes coupling the device 40/100 to a micrometer 10. For example, coupling the device 40/100 to the micrometer 10 includes snapping the device 40/100 onto the micrometer frame 12. In some embodiments, step 122 further includes rotating the cover 52 of the device 100 in order to snap it onto the micrometer frame 12. Additionally, coupling the device 40/100 to the micrometer 10 includes sliding the collet 70 over the ratchet 24 of the micrometer 10 to engage the collet 70 with the ratchet 24.

Step 124 includes receiving user input and, more specifically, the controller 60 receiving user input. For example, an operator can press one or more buttons 66 on the user interface 64 to provide user input to the device 40/100. As described above, in some embodiments, the operator can press a first button 66 to adjust the micrometer 10 and, more specifically, the spindle 16 in a first lateral direction (e.g., toward the first end 34 of the micrometer 10); can press a second button 66 to adjust the micrometer 10 and, more specifically, the spindle 16 in a second, opposite lateral direction (e.g., toward the second end 36 of the micrometer 10); and can press a third button 66, or press the first and second buttons 66 simultaneously to initiate an automatic cycling operation.

Step 126 includes operating the motor 68 to adjust the micrometer 10 based on the user input received at step 124. For example, based on the user input, the controller 60 controls the motor 68 to automatically adjust the micrometer 10 to open or close the measurement space 28 between faces 30, 32 of the anvil 14 and the spindle 16. More specifically, the controller 60 can control the motor 68 in a first rotational direction (e.g., in response to the first button 66 being pressed) in order to rotate the ratchet 24 in the first direction and, in turn, drive the micrometer 10 in a first lateral direction. Further, the controller 60 can control the motor 68 in a second, opposite rotational direction (e.g., in response to the second button 66 being pressed) in order to rotate the ratchet 24 in the second direction and, in turn, drive the micrometer 10 in a second lateral direction.

Referring still to step 126, the controller 60 can continue operating the motor 68 to drive the micrometer 10 until the operator stops pressing a button 66 and, upon no longer receiving the user input, cease operation of the motor 68. Furthermore, in the case of an automatic cycling operation, the controller 60 can continue operating the motor 68 to adjust the micrometer 10 until the spindle face 32 touches object in the measurement space 28. For example, in one embodiment, the automatic cycling operation is based on running the motor 68 back and forth for a period of time. The controller 60 can operate the motor 68 for a first time period, about one second, backward and then for a second time period, about one second, forward until it completes this cycle a certain number of times, such as three times. The motor 68 stops with the anvil 14 in an open position relative to the part for ease of removal. Accordingly, this example illustrates an open-loop system where the controller 60 does not receive information from the motor 60 (e.g., it does not get information on whether the cycle was completed successfully or at what point in the cycle it is currently, compared to a closed-loop where it would constantly receive feedback). However, in some embodiments, the automatic cycle operation can be executed based on a closed-loop system. In such embodiments, the controller 60 can incorporate additional hardware, such as an encoder, and additional programming to operate the motor 68 (such as a DC motor, servo motor, or stepper motor) using feedback in a closed-loop fashion. Once the micrometer 10 has been adjusted according to the user input, for example, when the operator is satisfied that the anvil and spindle faces 30, 32 are contacting an object in the measurement space 28, the operator can read the resulting measurement on the micrometer 10 (e.g., via the sleeve 18 or the interface 26).

Additionally, in some embodiments, as shown in FIG. 20, the method 120 can optionally further include uncoupling the device 40/100 from the micrometer 10 (step 128). In this manner, the method 120 can be repeated with different micrometers 10. Furthermore, while the steps 122-128 of the method 120 are shown in a particular order in FIG. 20 with a start and end point, it should be noted that one or more steps 122-128 can be repeated. For example, steps 124 and 126 can be repeated while the device 40/100 is coupled to the micrometer 10 in order to measure different objects in the measurement space 28.

In light of the above, some embodiments provide a micrometer driver device to automatically control motion of a micrometer. The device can facilitate optimal one-handed operation of the micrometer via directional buttons located adjacent the frame of the micrometer instead of a traditional rotary dial distal from the frame, thus improving speed and accuracy of the micrometer. The device can be retrofit onto and reusable with multiple different micrometers due to its ability to be snapped onto a top of a micrometer frame.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A device for driving a micrometer, the device comprising:
   a first body configured to be coupled to a frame of the micrometer;
   a second body configured to be coupled to a ratchet of the micrometer and to rotate the ratchet; and
   a rail portion coupled between the first body and the second body, wherein the second body is slidable along the rail portion.

2. The device of claim 1, wherein the second body includes a collet configured to be coupled to the ratchet.

3. The device of claim 2, further comprising a motor coupled to the collet and configured to rotate the ratchet via the collet.

4. The device of claim 3, wherein the second body slides along the rail portion in a first linear direction when the ratchet is rotated by the motor in a first rotational direction and slides along the rail portion in a second, opposite direction when the ratchet is rotated by the motor in a second, opposite rotational direction.

5. The device of claim 4, further comprising a controller configured to control rotation of the motor.

6. The device of claim 5, further comprising a user interface in communication with the controller, wherein the controller is configured to control rotation of the motor based on user input received through the user interface.

7. The device of claim 6, wherein the user interface includes a plurality of buttons.

8. The device of claim 7, wherein the controller is configured to control rotation of the motor in the first rotational direction when a first button of the plurality of buttons is pressed, and to control rotation of the motor in the second rotational direction when a second button of the plurality of buttons is pressed.

9. The device of claim 7, wherein the controller is configured to control rotation of the motor in the first rotational direction until a spindle of the micrometer reaches an object when a first button of the plurality of buttons is pressed.

10. The device of claim 1, wherein the first body includes a cover and a housing, wherein the cover is configured to be removably coupled to the frame of the micrometer.

11. The device of claim 10, wherein the cover is rotatable relative to the housing.

12. The device of claim 1, wherein the second body includes an opening through which the rail portion slides to enable the second body to slide along the rail portion.

13. The device of claim 1, wherein the second body includes a track; and the rail portion includes a protrusion slidable along the track to enable the second body to slide along the rail portion.

14. A device for driving a micrometer, the device comprising:
   a body configured to be coupled to a frame of the micrometer;
   a collet configured to be coupled to a ratchet of the micrometer and to rotate the ratchet;
   a motor coupled to the collet, wherein the motor rotates the collet to rotate the ratchet; and
   a controller that controls operation of the motor.

15. The device of claim 14, further comprising a user interface, wherein the controller controls operation of the motor based on user input from the user interface.

16. The device of claim 15, wherein the user interface is located on the body.

17. A method for automatically driving a micrometer using a device coupled to the micrometer, the method comprising:
   receiving user input via a user interface of the device; and
   operating a motor of the device to rotate a ratchet of the micrometer to drive the micrometer in a first direction in response to the user input.

18. The method of claim 17, further comprising operating the motor of the device to rotate the ratchet of the micrometer to drive the micrometer in a second direction, opposite the first direction, in response to the user input.

19. The method of claim 17, further comprising ceasing operation of the motor when the user input is no longer received.

20. The method of claim 17, further comprising continuing operating the motor until a spindle of the micrometer reaches an object to be measured.

* * * * *